(12) United States Patent
Kang et al.

(10) Patent No.: US 10,762,215 B2
(45) Date of Patent: Sep. 1, 2020

(54) WEARABLE DEVICE AND DATA SECURITY METHOD THEREOF

(71) Applicant: ELECTRONICS AND TELECOMMUNICATIONS RESEARCH INSTITUTE, Daejeon (KR)

(72) Inventors: Tae Wook Kang, Daejeon (KR); Kwang Il Oh, Daejeon (KR); Sung Eun Kim, Daejeon (KR); Sung Weon Kang, Daejeon (KR); Hyung-Il Park, Daejeon (KR); Jung Bum Kim, Daejeon (KR); Mi Jeong Park, Daejeon (KR); Seong Mo Park, Daejeon (KR); In Gi Lim, Daejeon (KR); Byounggun Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 372 days.

(21) Appl. No.: 15/828,066

(22) Filed: Nov. 30, 2017

(65) Prior Publication Data

US 2018/0189500 A1    Jul. 5, 2018

(30) Foreign Application Priority Data

Jan. 5, 2017  (KR) .................. 10-2017-0001962
Aug. 7, 2017  (KR) .................. 10-2017-0099814

(51) Int. Cl.
*G06F 21/60* (2013.01)
*G06F 21/81* (2013.01)
*G06F 1/16* (2006.01)
*G01R 19/04* (2006.01)
(Continued)

(52) U.S. Cl.
CPC .............. *G06F 21/60* (2013.01); *G01R 1/28* (2013.01); *G01R 19/0084* (2013.01); *G01R 19/04* (2013.01); *G06F 1/163* (2013.01); *G06F 21/81* (2013.01)

(58) Field of Classification Search
CPC .......... G06F 21/60; G06F 21/81; G06F 1/163; G01R 1/28; G01R 19/04; G01R 19/0084; H04W 52/0254; H04W 52/0251; A61B 5/6801; A61B 5/6813; A61B 5/681
See application file for complete search history.

(56) References Cited

U.S. PATENT DOCUMENTS 8,565,206 B2  10/2013  Lee et al.
2003/0080751 A1*  5/2003  Kant .................. G01R 19/04
                                                            324/606
2009/0144069 A1  6/2009  Kang et al.
(Continued)

FOREIGN PATENT DOCUMENTS

KR    10-1343717 B1    12/2013

*Primary Examiner* — Nelson S. Giddins

(57) ABSTRACT

Provided is an operating method of a wearable device, the method including setting a threshold voltage when there is not a physical contact of an outsider, measuring an envelope voltage while performing a data communication, determining whether to be the physical contact with the outsider by comparing the threshold voltage with the envelope voltage, and stopping the data communication, when there is the physical contact with the outsider.

20 Claims, 7 Drawing Sheets

(51) Int. Cl.
*G01R 1/28* (2006.01)
*G01R 19/00* (2006.01)

(56) References Cited

U.S. PATENT DOCUMENTS

| | | | | |
|---|---|---|---|---|
| 2010/0220054 A1* | 9/2010 | Noda | ............... | G06F 3/014 |
| | | | | 345/156 |
| 2013/0222235 A1* | 8/2013 | Abdollahi | .......... | G02B 27/0172 |
| | | | | 345/156 |
| 2016/0308627 A1 | 10/2016 | Park et al. | | |
| 2017/0060178 A1* | 3/2017 | Ito | ............... | H04W 52/0254 |
| 2018/0262222 A1* | 9/2018 | Uno | .............. | H04B 1/10 |

* cited by examiner

WEARABLE DEVICE AND DATA SECURITY METHOD THEREOF

CROSS-REFERENCE TO RELATED APPLICATIONS

This U.S. non-provisional patent application claims priority under 35 U.S.C. § 119 to Korean Patent Application Nos. 10-2017-0001962, filed on Jan. 5, 2017 and 10-2017-0099814, filed on Aug. 7, 2017, in Korean Intellectual Property Office, the entire contents of which are incorporated herein by reference.

FIELD OF THE INVENTION

The present disclosure herein relates to a wearable device and a data security method thereof, and more particularly, to a wearable device applied to a human body communication system and a data security method thereof.

BACKGROUND

Human body communication is a technology for performing data communication using a human body. In other words, the human body communication does not use wired or wireless communication, but uses the human body as a transfer medium of an electrical signal. There are many ways in human body communication. As an example, human communication may use a change in current flowing in a human body. In other words, the human body communication may be performed by contacting an electrode of a transmitter and a receiver with the human body and changing a fine current. As another embodiment, human communication may use a change in surface electric field of the human body. In this way, the human body communication may transmit various data by taking the human body as a medium.

When human body communication using a human body as a transmission medium is used, communication between mobile devices or communication between a fixed device and a user may be performed through a contact of the user. For example, communications between mobile devices such as a digital camera and a smartphone and peripheral electronic devices may be performed through a contact of a user. Printing, credit card payment, TV reception, entrance control system, or transportation fee payment at the time of riding, etc., may be performed through a contact of a user. In addition, communication with electronic devices attached to the human skin or inserted into a human body may be performed by adopting the human body as a medium. Human body communication using capacitive coupling is standardized as wireless body area network (WBAN)-related international standard IEEE 802.15.6 WBAN. Such human body communication using capacitive coupling may be usable as a communication method of a wearable device.

SUMMARY

The present disclosure provides a wearable device and a data security method thereof for preventing a leakage of communication data of a user, which may occur in a situation of an unpredictable physical contact with an outsider.

An embodiment of the inventive concept provides an operating method of a wearable device including: setting a threshold voltage when there is no physical contact with an outsider; measuring an envelope voltage while performing data communication; determining whether there is the physical contact with the outsider by comparing the threshold voltage with the envelope voltage; and stopping the data communication when there is a physical contact with the outsider.

In an embodiment, the setting of the threshold voltage may include: measuring the envelope voltage when there is no physical contact of the outsider; obtaining a positive average value of the measured envelope voltage; and setting a voltage obtained by subtracting a pre-determined voltage from the average value to the threshold voltage.

In an embodiment, the setting of the threshold voltage may include: measuring the envelope voltage when there is no physical contact; obtaining a maximum value of the measured envelope voltage; and setting a voltage obtained by subtracting a pre-determined voltage from the maximum value to the threshold voltage.

In an embodiment, the performing of data communication may include: performing communication between wearable devices using capacitive coupling as a communication scheme.

In an embodiment, each of the wearable devices may perform communication according to international standard IEEE 802.15.6 wireless body area network (WBAN).

In an embodiment, the determining of whether there is the physical contact with the outsider may include determining whether the threshold voltage is greater than the envelope voltage for a first time.

In an embodiment, the data security method may further include performing the data communication continuously, when the threshold voltage is not greater than the envelope voltage.

In an embodiment, the data security method may further include determining that there is the physical contact with the outsider, when the threshold voltage is greater than the envelope voltage.

In an embodiment, the data security method may further include stopping the data communication and notifying a user of the physical contact with the outsider, when it is determined that there is the physical contact with the outsider.

In an embodiment, the data security method may further include: measuring an envelope voltage of a received signal after stopping of the data communication; and determining whether the threshold voltage is less than the measured envelope voltage for a second time.

In an embodiment, the data security method may further include resuming the stopped data communication, when the threshold voltage is less than the envelope voltage for the second time.

In an embodiment, the data security method may further include re-measuring an envelope voltage of a received signal, when the threshold voltage is not less than the measured envelope voltage for the second time.

In an embodiment of the inventive concept, a wearable device includes: a signal receiver configured to receive a signal through a human body; an envelope detector configured to measure an envelope voltage of the received signal; and a voltage comparator configured to compare a threshold voltage with the envelope voltage, wherein the threshold voltage is a value obtained by subtracting a pre-determined voltage from an envelope voltage measured when there is no physical contact with an outsider, and when data communication is performed with a signal transmitter and when the threshold voltage is greater than the measured envelope voltage, the data communication corresponding to the received signal is stopped or a communication holding signal is transmitted to the signal transmitter.

In an embodiment, the voltage comparator may determine whether the threshold voltage is greater than the envelope voltage for a first time at a time of the data communication, and when the threshold voltage is greater than the envelope voltage for the first time, the data communication may be stopped or the communication holding signal may be transmitted to the signal transmitter.

In an embodiment, the voltage comparator may determine whether the threshold voltage is less than the envelope voltage for a second time after the data communication is stopped or the communication holding signal is transmitted, and when the threshold voltage is less than the envelope voltage for the second time, the data communication may be resumed.

In an embodiment, the wearable device may further include: a signal electrode configured to contact the human body; and a ground of a printed circuit board in which the signal receiver is implemented.

In an embodiment of the inventive concept, a data receiving method of a wearable device includes: receiving a signal via a human body for data communication with an outside; filtering and amplifying the received signal; measuring an envelope voltage of the filtered and amplified signal; comparing a threshold voltage with an envelope voltage of the amplified signal; and blocking the data communication when the envelope voltage of the amplified signal is less than the threshold voltage during a predetermined time.

In an embodiment, the data communication may use a capacitive coupling scheme for data transmission.

In an embodiment, the data receiving method may further include: setting the threshold voltage, when the data communication is proceeded.

In an embodiment, the setting of the threshold voltage may include: setting the threshold voltage using an average value of the envelope voltage of the received signal, which is measured during the predetermined time; and storing data corresponding to the set threshold voltage.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
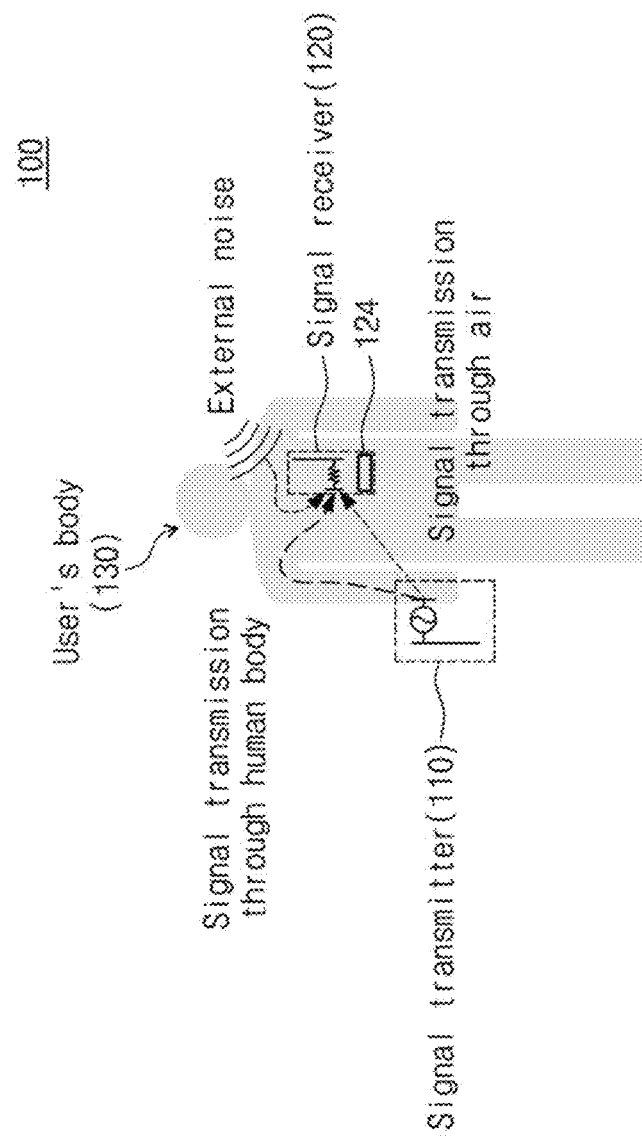
FIG. 1 is an exemplary block diagram showing a capacitive coupling communication process according to an embodiment of the inventive concept.

Hereinafter, an exemplary embodiment of the present invention will be described in detail with reference to the accompanying drawings such that a person skilled in the art may easily carry out the embodiments of the inventive concept.

Since various changes may be made and several forms may be embodied in the embodiments according to the concept of the present disclosure, the embodiments are intended to be illustrated in the drawings and described in detail herein. However, the present invention is not limited to the specific disclosed forms, and needs to be construed to include all modifications, equivalents, or replacements included in the spirit and technical range of the present invention.

It will be understood that, although the terms first, second, etc. may be used herein to describe various elements, these elements should not be limited by these terms. The above terms are used only to distinguish one component from another. For example, a first component may be referred to as a second component and likewise a second component may be referred to as a first component without departing from the scope of rights according to the concept of the present disclosure.

Terms used herein are provided for merely explaining specific embodiments of the present disclosure, not limiting the disclosure. As used herein, the singular forms "a," "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, components or combinations thereof, but do not preclude the presence or addition of one or more other features, integers, steps, operations, elements, components, or combinations thereof.

Unless otherwise defined, all terms used herein including technical or scientific terms are same as those generally understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an exemplary block diagram showing a capacitive coupling communication process according to an embodiment of the inventive concept. Referring to FIG. 1, a capacitive coupling communication system 100 may include a signal transmitter 110, a signal receiver 120, and the user' body 130.

The signal transmitter 110 may be implemented to be connected to a part of the body. The signal transmitter 110 may be configured to modulate data and transmit the modulated data to the human body 130. Here, the human body 130 may operate as a channel for delivering a signal delivered from the signal transmitter 110 to the signal receiver 120. For example, the channel may be formed of an electrical signal of the signal transmitter 110 and electric potential difference formed around the human body 130. In an embodiment, the signal transmitter 110 may be a wearable device that is attachable or detachable. For example, the signal transmitter 110 may include various physical contact devices such as a smart watch, smart glasses, and a smart necklace.

The signal receiver 120 may be configured to receive a signal delivered from the human body 130 and recover data. Here, the recovered data may be delivered to an external device by a communication method different from the human body communication. At this point, all transmission paths such as the human body 130 and a wireless path through which a signal is delivered from the signal transmitter 110 to the signal receiver 120 are defined as a human body channel, and an electrical signal induced from the outside to the human body may be defined as an external noise. In an embodiment, the signal receiver 120 may be a wearable device that is attachable or detachable. For example, the signal receiver 120 may include various physical contact devices such as a smart watch, smart glasses, and a smart necklace.

In addition, the signal receiver 120 may include a sensing device 124. The sensing device 124 may be configured to sense a physical contact of an outsider. For example, the sensing device 124 may monitor an envelope voltage Ven of a reception signal and may determine whether to be a physical contact with the outsider by comparing a predetermined value with the monitored envelope voltage Ven.

Human body communication of a capacitive coupling scheme uses, as a communication channel, signal delivery by electric potential difference of electrical signal applied to a human body. A data signal transmitted with the human body taken as a medium may be measured using a receiver connected to another portion of the human body or outside the human body. In the human body communication using the capacitive coupling scheme, characteristics of a reception signal may be varied according to channel characteristics varied by surrounding environments, etc.

Since the capacitive coupling uses a human body medium of a user as a communication channel, when an unpredictable physical contact occurs between the user and an outsider in a crowded situation such as riding in public transportation vehicle or an elevator, data information of the user may be transmitted to the outsider being in contact in a too short time for the user to cope with. In addition, for example, when the outsider intentionally tries to contact the body of a specific user for acquiring communication data, the user's data may be leaked.

A wearable device according to an embodiment of the inventive concept may include a capacitive coupling communication device to play a role of a transmitter and a receiver. A data security method of the wearable device of the inventive concept may include, before a start of a desired data communication, a correction process measuring a voltage magnitude of a signal received between wearable devices in a case where a user normally performs a communication using the wearable device without a physical contact with an outsider. At this point, the voltage magnitude of the received signal may be a positive envelope voltage Ven of the received signal.

Furthermore, a data security method of a wearable device according to the inventive concept may include an amplification process for filtering the reception signal to be suitable for a communication signal band, or for increasing an amplitude of the reception signal, if necessary.

In addition, a data security method of a wearable device according to the inventive concept may include a process in which a threshold voltage is determined which is less than a voltage of a received signal, after measuring a magnitude of an envelope voltage of the signal received when a user normally performs a communication without a physical contact with an outsider. A capacitive coupling communication device of the wearable device may determine whether the envelope voltage which is greater than the threshold voltage is input, by comparing the envelope voltage with the threshold voltage, when the user normally performs a communication without the physical contact with the outsider.

On the other hand, due to communication characteristics using capacitive coupling, when the outsider's physical contacts the user's body, coupling between the earth ground and a ground plane of a communication device, which is in operation on the user's body, may be weakened and the magnitude of the received signal may be reduced. Accordingly, an input signal of the receiver, namely, the envelope voltage may be reduced than that at the time of normal operation. Thus, a data security method of a wearable device of the inventive concept may include a process checking occurrence of a physical contact with the outsider by detecting an envelope voltage signal less than the threshold voltage.

In addition, when the occurrence of the physical contact with the outsider is confirmed, the data security method may include a process informing a situation of the physical contact with the outsider to the user, and transmitting a communication stopping signal or a communication holding signal to wearable devices being used by the user. Accordingly, although the user does not take a separate action at the time of the physical contact with the outsider, the communication may be immediately stopped and an external leakage of data may be blocked according to the proposed method.

Figure 2:
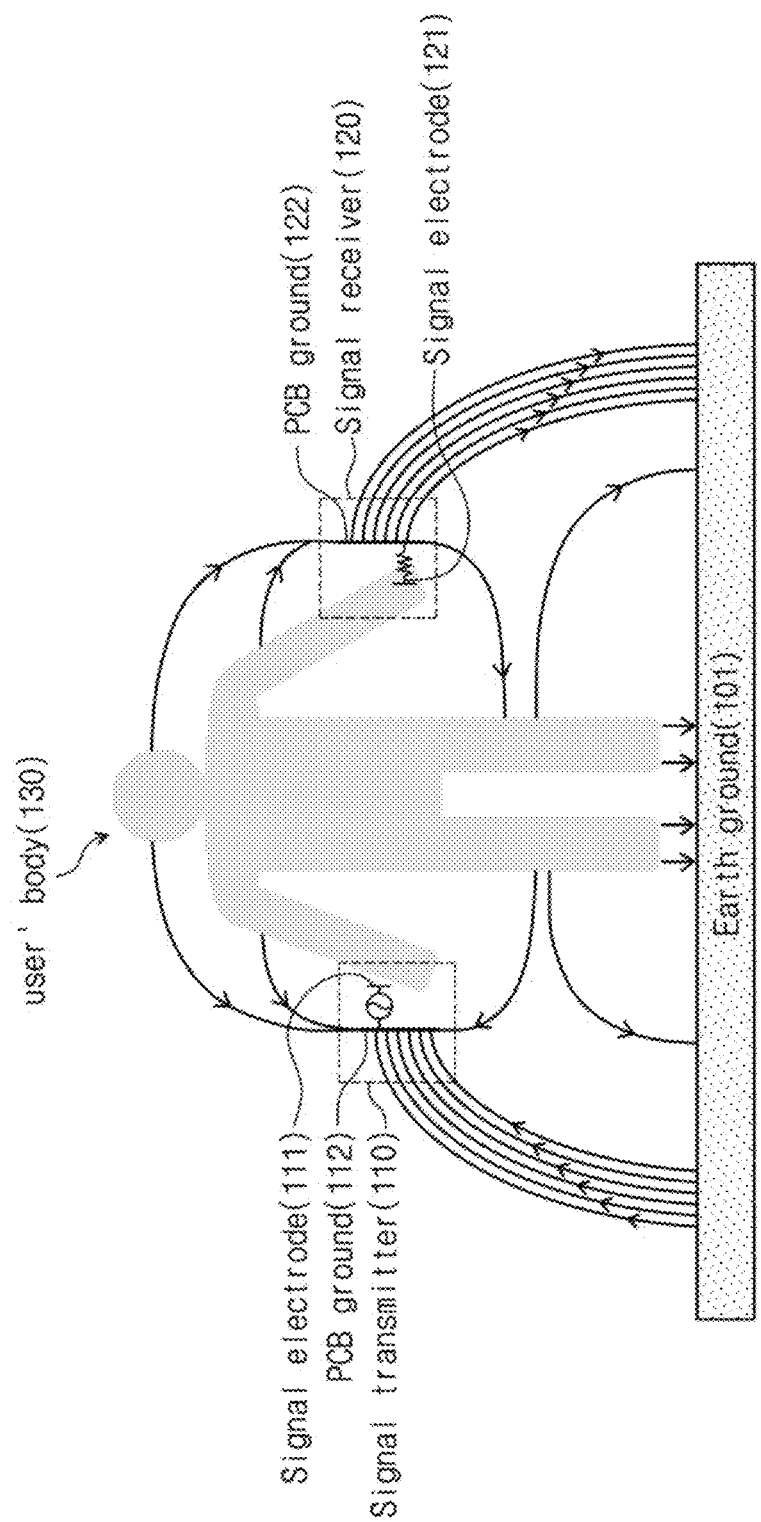
FIG. 2 is a drawing showing formation of signal electric potential between a transmitter and receiver, when the transmitter and receiver are configured using capacitive coupling on the both wrists according to an embodiment of the inventive concept.

FIG. 2 is a drawing showing formation of signal electric potential between a transmitter and receiver, when the transmitter and receiver are configured on the both wrists using capacitive coupling according to an embodiment of the inventive concept. The signal electric potential may be formed by including the user's body 130, the signal transmitter 110, the signal receiver 120, and the earth ground 101, etc.

Each of the signal transmitter 110 and the signal receiver 120 may include signal electrodes 111 and 121 influencing the formation of the electric potential, and grounds 112 and 122 configured in printed circuit boards (PCB) of the transmitter 110 and the receiver 120. Each of a transmission signal and a reception signal may be transmitted to the human body 130 through each of the signal electrodes 111 and 121 contacted to the human body 130, or may be delivered through the human body 130.

Each of the signal transmitter 110 and the signal receiver 120 may play a role of a communication device for data transmission and reception between wearable devices. In order to maximize a magnitude of electric potential difference of a signal applied to the human body 130 and a magnitude of electric potential difference of a reception signal input to the receiver 120, that is, in order to maximize an amplitude variation of a signal, channels may be formed to make coupling occur greatly between the earth ground 101 and each of the PCB grounds 112 and 122 of the signal transmitter 110 and the signal receiver 120. At this point, when an outsider contacts the user's body 130, the outsider's body is extended to a communication channel, namely, a signal transmission path having electric potential difference with the ground, and the coupling between the earth ground 101 and each of the PCB grounds 112 and 122 of the signal transmitter 110 and the signal receiver 120 may be weakened. Accordingly, a voltage magnitude of the signal applied to the human body 130 may be reduced or a voltage magnitude of the received signal may be reduced. Consequently, the magnitude of the reception signal of the receiver is less than that in a normal communication situation in which only the user's body is used as the channel.

Figure 3:
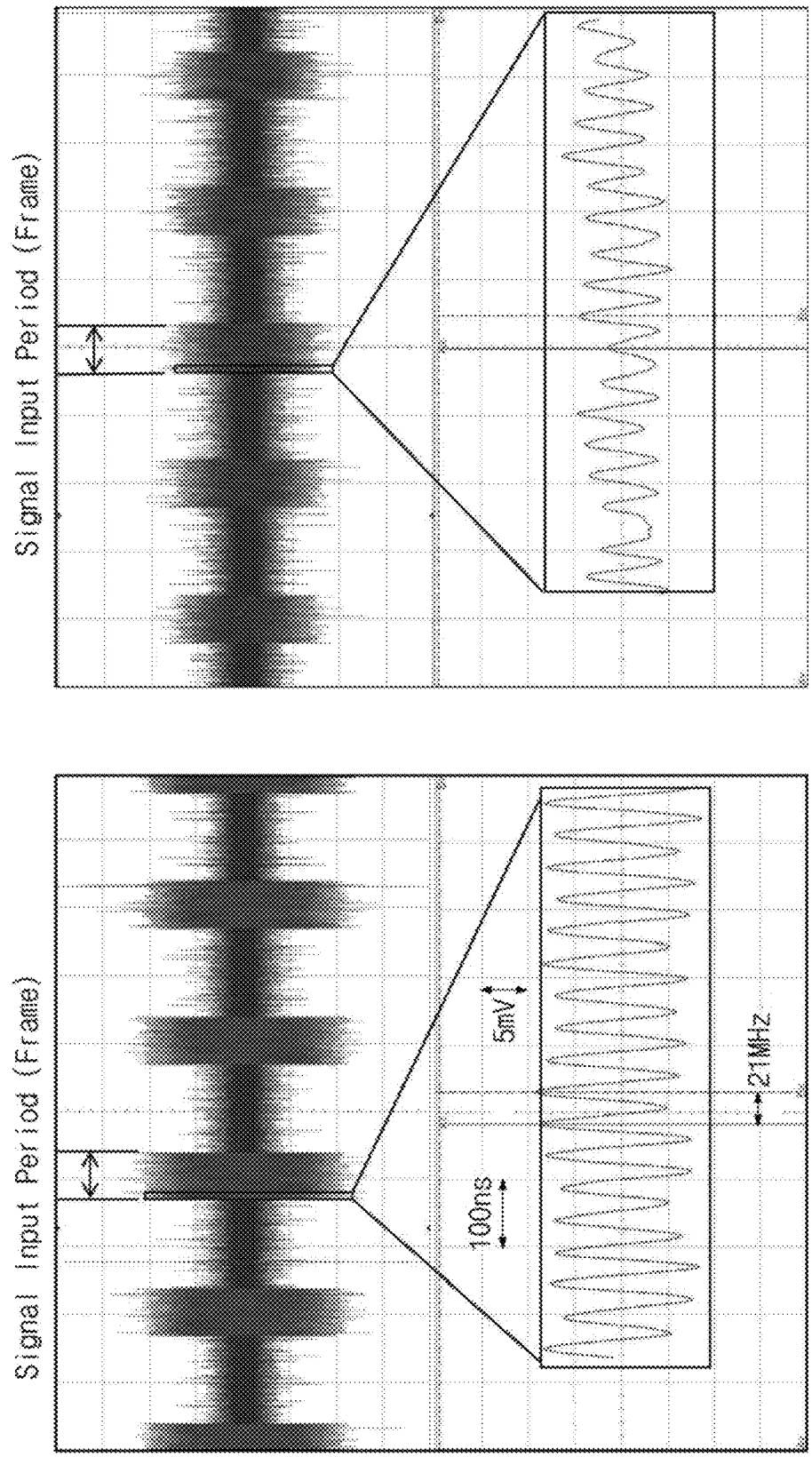
FIG. 3 presents magnitude variations in signals received when only the single body of a user is used as a communication channel and when an outsider contacts the user's body.

FIG. 3 is a drawing showing magnitude variations in signals received when only the single body of the user is used as a communication channel and when an outsider contacts the user's body. At this point, as an embodiment, a communication between the both wrists as shown in FIG. 2 is exemplified which is formed by wearing a transmitter and receiver having PCB areas (ground areas) of the approximately 3 cm×5 cm size in a watch type.

It is exemplified that a physical contact with an outsider has occurred at the wrist on which the signal transmitter 110 has been worn, and in order to minimize a connection influence of measurement equipment with the ground, FTB-1-6 balun manufactured by mini-circuits has been adopted as the signal receiver 120. A reception signal has been measured by connecting a passive probe and an oscilloscope to the signal receiver 120. Here, a transmission signal applied to the human body 130 may be a digital signal having a central frequency of 21 MHz generated by an operation clock frequency 42 MHz of a human body communication, which is defined in IEEE 802.15.6 WBAN international standard. The frequency and formation of the transmission signal may be differed according to a capacitive coupling signal transmission scheme (e.g. modulation scheme) used in a wearable device and an application service.

The signal shown in FIG. 3 is a signal passed through a high-pass filter and a low-pass filter for removing a noise with 21 MHz as a central frequency by using a filter function embedded in the oscilloscope. As shown in FIG. 3, the signal may be transmitted by a frame unit and may be distinguished through a voltage amplitude difference between a period with an input signal and a period without the input signal. When there is no physical contact with an outsider, an average of V peak-to-peak amplitude of the measured reception signal is approximately 12.8 mV. On the other hand, when there is the physical contact with the outsider, an average of V peak-to-peak amplitude of the measured reception signal is approximately 7.5 mV. A reduction in V peak-to-peak amplitude in a case where there is the physical contact with the outsider occurs approximately 41% of the average of V peak-to-peak amplitude of a reception signal. In other words, when the physical contact occurs between the user and the outsider, it may be confirmed that the magnitude of the reception signal is less than a case without the physical contact.

Figure 4:
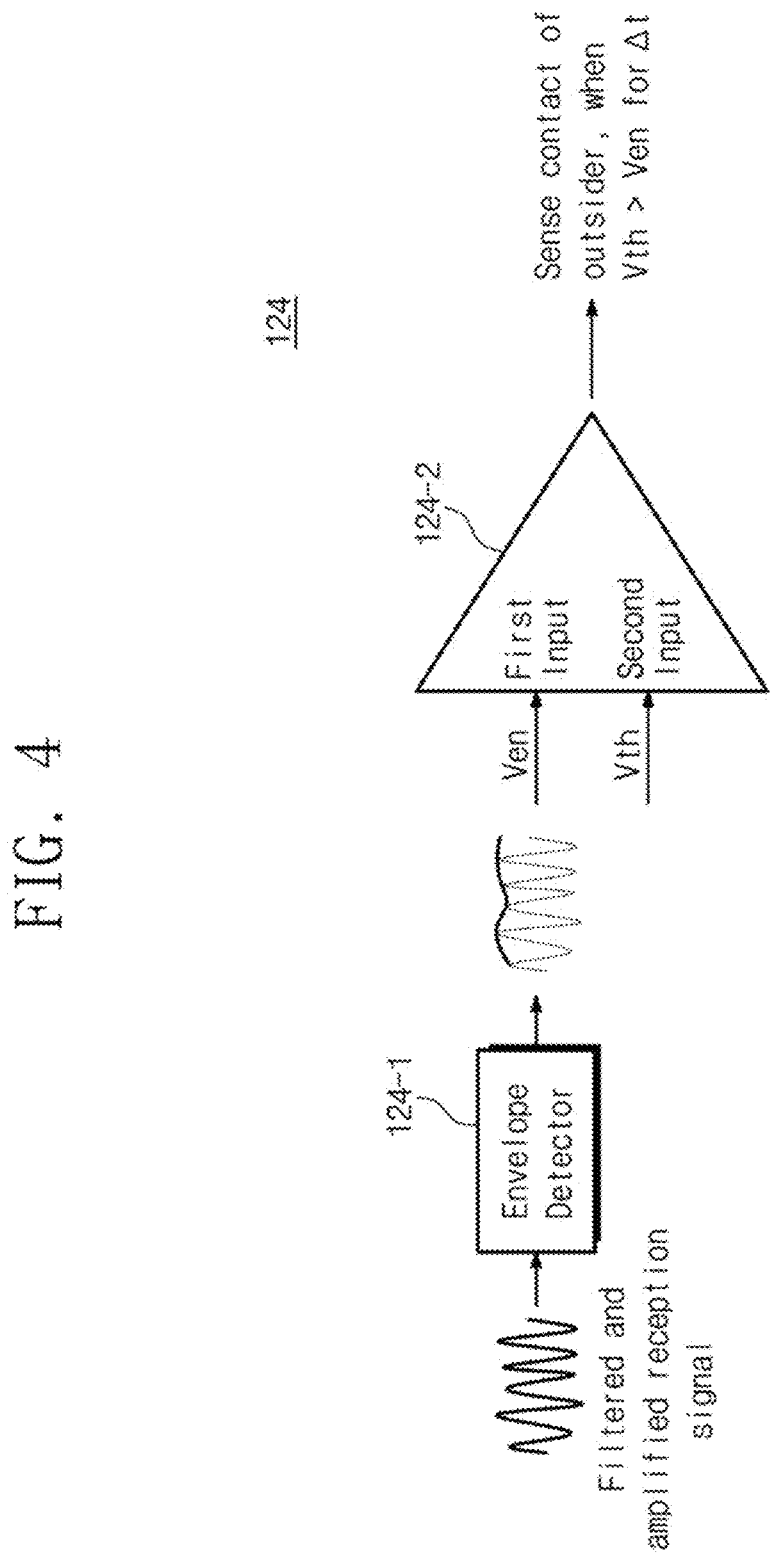
FIG. 4 is a drawing exemplarily showing a sensing device for detecting a magnitude variation of amplitude of a reception signal generated according to whether to contact the outsider through voltage comparison with a pre-determined threshold voltage Vth and for sensing a contact with the outsider.

FIG. 4 is a drawing exemplarily showing a sensing device 124 for detecting a magnitude variation of amplitude of a reception signal generated according to whether to contact the outsider through voltage comparison with a pre-determined threshold voltage Vth and for sensing a contact with the outsider. Referring to FIG. 4, the sensing device 124 may include an envelope detector 124-1 and a voltage comparator 124-2.

The envelope detector 124-1 may be configured to receive a reception signal in an AC type and generate the envelope voltage Ven. Here, the reception signal may be a signal which is filtered and amplified at the signal receiver 120.

The voltage comparator 124-2 may be configured to receive, as a first input, a positive envelope detection value of the reception signal, namely the envelope voltage Ven and, as a second input, the threshold voltage Vth, and compare the first input voltage with the second input voltage. According to an output value of the voltage comparator 124-2, the contact of the outsider may be determined.

For example, when the threshold voltage Vth is greater than the envelope voltage Ven for a pre-determined time t, it may be determined that the outsider's body contacts the user's body. At this point, when a signal is normally transmitted or received by using only the user's body without the physical contact with the outsider's body, the threshold voltage Vth may be determined to be less than an average value of the positive envelope voltage Ven of the reception signal by a pre-determined voltage ΔV. Here, the average value may refer to a positive average value. At this point, the receiver 120 may be configured to filter the reception signal to be suitable for a communication signal band or amplify amplitude of the reception signal, if necessary.

Figure 5:
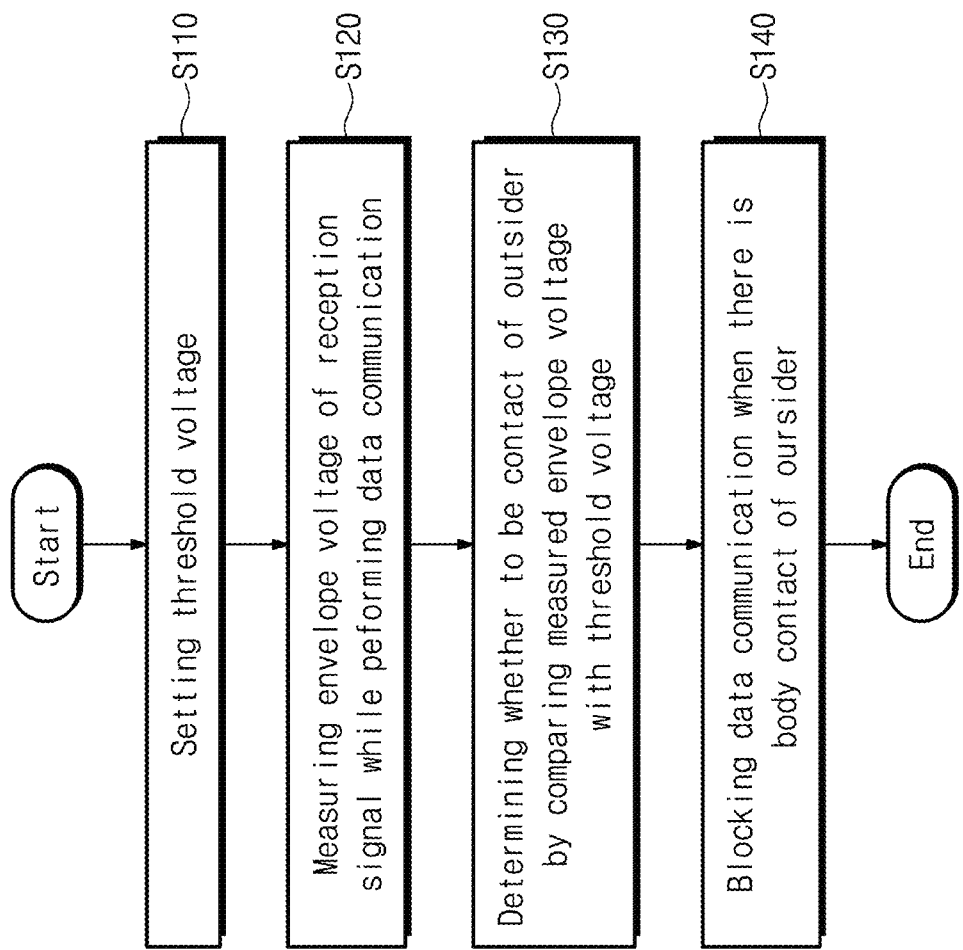
FIG. 5 is a flowchart exemplarily showing a data security method of a wearable device according to an embodiment of the inventive concept.

FIG. 5 is a flowchart exemplarily showing a data security method of a wearable device according to an embodiment of the inventive concept. Referring to FIGS. 1 to 5, the data security method of the wearable device may be proceeded as the following.

When there is no physical contact with the outsider, a signal receiver (see 120 of FIG. 1) of the wearable device may set a threshold voltage (see Vth of FIG. 4) (operation S110). Here, the threshold voltage may be set using an envelope voltage Ven detected by an envelope detector 124-1 (see FIG. 4). For example, the threshold voltage Vth may be set to an average value of the envelope voltage Ven during a pre-determined time, when there is no contact with the outsider. In another embodiment, the threshold voltage Vth may be set to a value obtained by subtracting a prescribed value from the average envelope voltage Ven. In an embodiment, data corresponding to the set threshold voltage Vth may be stored in a memory or a register inside the signal receiver 120. The sensing device 124 may further include a voltage generator generating the threshold voltage Vth according to the data corresponding to the threshold voltage Vth.

Then, the envelope detector 124-1 of the sensing device 124 may measure the envelope voltage Ven of the reception signal, when a signal is received by the signal receiver 120 (operation S120). In other words, the envelope voltage Ven of the reception signal may be measured, while the wearable device performs data communication.

Then, the comparator 124-2 of the sensing device 124 may determine whether to be the physical contact with the outsider by comparing the measured envelope voltage Ven with the threshold voltage Vth (operation S130).

When there is the physical contact with the outsider, the data communication of the wearable device may be blocked (operation S140). In other words, when the measured envelope voltage Ven is less than the threshold voltage Vth during the predetermined time, it may be determined that there is the physical contact with the outsider. At this point, the data communication of the wearable device may be immediately stopped.

On the other hand, a data security method of a wearable device according to an embodiment of the inventive concept may inform, to the user, a situation of the physical contact with the outsider at the time of physical contact with the outsider.

Figure 6:
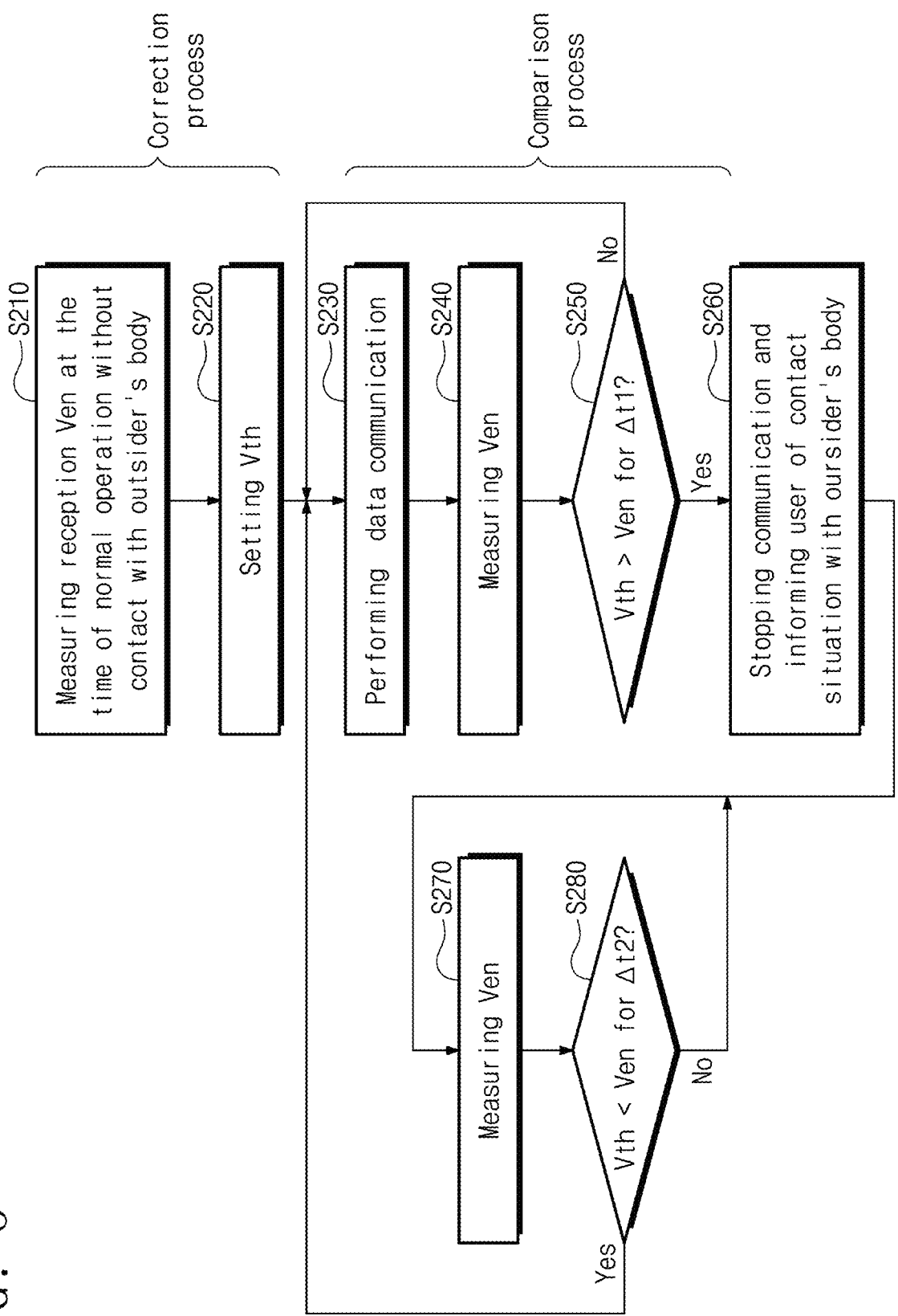
FIG. 6 is a flowchart exemplarily showing a data security method of a wearable device according to another embodiment of the inventive concept.

FIG. 6 is a flowchart exemplarily showing a data security method of a wearable device according to another embodiment of the inventive concept. Referring to FIG. 6, the data security method of the wearable device may be proceeded as the following.

The wearable device may include a capacitive coupling communication device having transmission and reception functions and the capacitive coupling communication device may include the signal receiver 120 described in the FIG. 1. Before a desired data communication starts, a correction process for security of human body communication may be performed in consideration of channel influence that may be varied according to a user and a communication environment.

In the correction process, the envelope voltage Ven of the reception signal may be measured at the time of performing communication in a normal operation without a physical contact with an outsider (operation S210). After measuring the envelope voltage Ven of the reception signal, a threshold voltage Vth less than the envelope voltage Ven by $\Delta V$ may be set (operation S220). For example, the threshold voltage Vth may be set to less than an average voltage of the envelope voltage Ven by $\Delta V$ or may be set to less than a maximum voltage of the envelope voltage Ven by $\Delta V$.

On the other hand, it should be understood that the method for setting the threshold voltage Vth is not limited thereto. The threshold voltage Vth may be set in various methods. Operations S210 and S220 may be included in the correction process before an actual communication is executed.

Thereafter, the wearable device may perform a desired data communication with an external device (operation S230). During the data communication, the wearable device may receive a signal from the external device. In such a data reception process, a signal receiver (see 120 of FIG. 1) may measure the envelope voltage Ven of an input signal (operation S230).

The signal receiver 120 of the wearable device may determine whether the threshold voltage Vth is greater than the envelope voltage Ven for a pre-determined time $\Delta t1$ (operation S250).

When the threshold voltage Vth is greater than the envelope voltage Ven for the pre-determined time $\Delta t1$, it may be determined that a physical contact occurs between the outsider's body and the user's body. Then the communication of the wearable device may be immediately stopped (operation S260). For example, when a case occurs where the threshold voltage Vth is greater than the envelope voltage Ven for time $\Delta t1$, the signal receiver 120 transmits a communication stop signal to other wearable devices, stops communication, and transmits, to the user, a notification signal of the physical contact by the outsider.

On the contrary, when the threshold voltage Vth is not greater than the envelope voltage Ven for time $\Delta t1$, operation S230 may be proceeded.

Thereafter, in a data reception process, the signal receiver 120 may measure the envelope voltage Ven of an input signal (operation S270). The signal receiver 120 of the wearable device may determine whether the threshold voltage Vth is less than the envelope voltage Ven for a pre-determined time $\Delta t2$ (operation S280).

When the signal receiver 120 determines that the threshold voltage Vth is less than the envelope voltage Ven for a pre-determined time $\Delta t2$, operation S230 may be proceeded. In other words, in a case where, for a reception signal in the signal receiver 120, the envelope voltage Ven is greater than the threshold voltage Vth for a pre-determined time $\Delta t2$, when the magnitude of the reception signal increases to a voltage that there is no physical contact with an outsider, a normal communication may be resumed. On the contrary, when the threshold voltage Vth is not less than the envelope voltage Ven for time $\Delta t1$, operation S270 may be proceeded.

The wearable device using capacitive coupling according to an embodiment of the inventive concept may prevent a leakage of user's communication data, which may occur in a situation of a physical contact with an outsider by the user, when a user uses the wearable device of the capacitive coupling communication method, using the above described sensing device 124 (FIG. 4).

In addition, the wearable device according to an embodiment of the inventive concept may minimize a configuration complexity without an additional sensor or security software by implementing data communication security using physical communication characteristics of the capacitive coupling.

The data security method of the wearable device according to an embodiment of the inventive concept may set a magnitude of a reception signal as a reference value at the time of normal communication using only the user's body as a channel and may set a voltage value less than the set reference value as a threshold voltage. Further, the data security method of the wearable device may determine that the outsider's body contacts the user's body when the magnitude of the reception signal is less than the threshold voltage for a pre-determined time and may stop the communication.

On the other hand, the wearable device and the data security method thereof are applicable to a wearable device.

Figure 7:
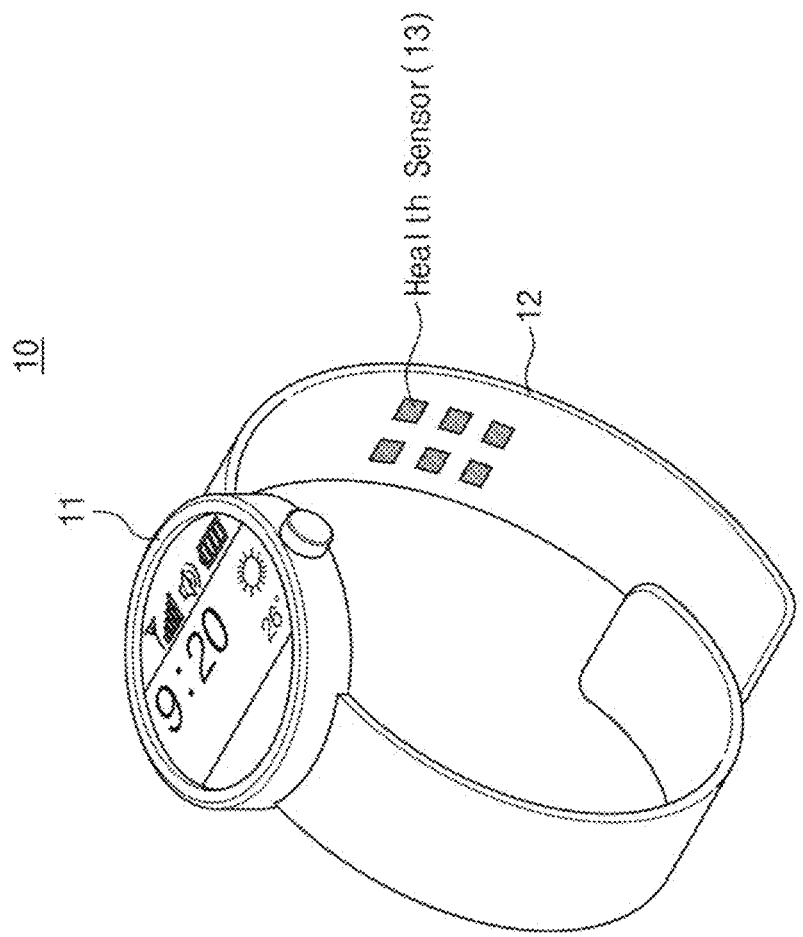
FIG. 7 exemplarily shows a wearable watch according to an embodiment of the inventive concept.

FIG. 7 is a drawing exemplarily showing a wearable watch 10 according to an embodiment of the inventive concept. Referring to FIG. 7, the wearable watch 10 includes a watch body 11 for performing a wireless communication, receiving data such as an image, a photo, or a character, etc., and displaying the data, and a watch band 12 for easily wearing on the user's wrist.

The watch body 11 may include a processor, a memory, an input/output (I/O) device, a display, a communication interface, sensors, and a power managing unit. The processor, the memory, the input/output device, the communication interface and the sensors may be connected to each other through a system bus. The processor may include a single processor having at least one core, or multiple processors having at least one core. The watch body 11 may include the signal transmitter 110 or the signal receiver 120 for performing a human body communication as illustrated in FIGS. 1 to 6.

The processor may be configured to accept, receive, convert, and process an audio frequency command by the user, together with the input/output device. For example, an audio codec may be used. The processor may execute instructions of an operation system (OS) or execute various applications. The processor may control command interactions between device components and control communications over the input/output device. For example, the OS may be, but not is limited to, Linux Android™, or Android Wear, etc.

The memory may include at least one of different kinds of memories. For example, the memory may be a RAM (i.e., DRAM or SRAM), a ROM, a cache, a virtual microdrive, hard disks, micro SD cards, or a flash memory, etc.

The input/output device is an assembly of components that receive and output information. For example, the components configuring the input/output devices, which receive, output or process data, may include a microphone, a messenging device, a camera, and a speaker. The input/output device may further include an audio chip, a display controller, and a touch screen controller.

The communication interface may include components for supporting unidirectional or bi-directional wireless communication, and may include a wireless network interface controller (or similar components) for wireless communication with respect to a network of several implementations or wired interfaces of other implementations, or a network of multiple interfaces. In an embodiment, the communication interface exists in order to preferentially receive data remotely. Here, the data is streaming data displayed on a display or updated. However, except for data selectively transmitted, the communication interface may provide voice transmission.

In an embodiment, the communication interface may support low and medium power radio frequency communications (RC). In an embodiment, for wireless communication, Bluetooth Low Energy (BLE), wireless local area network (WLAN), WiMAX, passive radio frequency identification (RFID), network adaptors or modems may be adopted. However, in another embodiment, for the wireless communication, a wide area network (WAN) interface, Wi-FI, a Wireless Personal Area Network (WPAN), multi-hop networks, or a cellular network (e.g., 3G, 4G, 5G or long term evolution (LTE)), etc., may be included. The remaining wireless options may include ultra wide band (UWB) and infrared, etc. In addition, the communication interface may include, except for the wireless interface, other types, for example, serial communication through contacts and/or USB communication. For example, a USB of a micro USB type, a flash drive, or another wired connection may be used together with the communication interface.

In an embodiment, the display may be integrated in the watch body 11. In another embodiment, the display may exist outside the watch body 11. The display may be flat or curved. Here, the curved one means that the display has an approximate curvature to be matched to a part (e.g., the wrist, ankle, or head, etc.) of the human body on which the wearable sensor platform is positioned.

The display may include a touch screen or a controlled gesture. The display may include an organic light emitting diode (OLED) display, a thin-film transistor liquid crystal display (TFT-LCD), or proper display technologies. The display may include an active matrix display. For example, the display may be an AMOLED display or a Super LCD (SLCD). The display may be 3-dimensional or flexible. The sensors may include microelectromechanical systems (MEMS) sensors. These sensors may include an accelerometer/gyroscope and a thermometer, etc.

A power management unit may be connected to a power source and may include a microcontroller for communicating and/or controlling power functions at a portion of the watch body (11). The power management unit communicates with a processor and adjusts power management. In an embodiment, the power management unit determines whether a power level drops below a certain value. In another embodiment, the power management unit determines whether a prescribed time passes for second charging.

The power source may be a permanent or an attachable/detachable battery, a fuel cell, or a photovoltaic cell, etc. The battery may be disposable. In an embodiment, the power source may include a rechargeable lithium ion battery, or the like. The power management unit may include a voltage controller and a charging controller for recharging the battery. For implementation, at least one solar cell may be used as the power source. The power source may also be charged by AC/DC power. Charging by the power source may be performed with or without contact. In an embodiment, the power management unit may control to supply battery power to an attachable/detachable sensor module through a power interface. In an embodiment, the battery may be embedded in the watch body 11. In another embodiment, the battery may exist outside the watch body 11.

As illustrated in FIG. 7, the appearance of the display of the watch body 11 may be implemented in a circle type or a round type. In other words, the watch body 11 includes a circular display panel.

In addition, the watch body 11 may contain therein a battery (not illustrated) for charging a power voltage in a wired charging type or a wireless charging type. Here, the wireless charging type may be at least one of various wireless charging types such as magnetic induction, magnetic resonance, electromagnetic induction, and non-radiative wireless charging (witricity). On the other hand, the battery may be implemented to be embedded in the watch band 12, not in the watch body 11.

In addition, the watch band 12 may include a health sensor 13 for sensing physiological data, namely, health data from at least one user. For example, the health sensor may sense a heartbeat, oxygen density in blood, temperature, blood pressure, blood sugar, or body fat, etc., of a wearer of the wearable watch 10.

According to an information security method of a wearable device using capacitive coupling as a communication scheme, the method can rapidly block, without a separate behavior of a user, a communication information leakage that occurs when the user of the wearable device using capacitive coupling communication contacts unpredictably an outsider.

In addition, the proposed method may reduce realization complexity by using physical communication characteristics of capacitive coupling, not by being driven by sensing by an additional sensor, or security software, etc.

A wearable device and a data security method thereof according to embodiments of the inventive concept are provided with a sensing device for monitoring an envelope voltage, and thereby may rapidly block, without a separate action of a user, a communication information leakage that occurs when the user of the wearable device unpredictably contacts an outsider.

In addition, a wearable device and a data security method thereof according to embodiments of the inventive concept may minimize implementation complexity by including a sensing device for determining whether to be a contact of an outsider using a physical characteristic of the capacitive coupling communication without an additional sensor or security software.

On the other hand, the foregoing description is about specific embodiments for practicing the present invention. The present invention encompasses the technical spirit of abstract and conceptual idea that may be used as a future technology as well as specific and actually useable means.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A data security method of a wearable device attached to a human body of a user, comprising:
   setting a threshold voltage when there is no physical contact between the user and an outsider;
   measuring an envelope voltage while performing data communication;

determining whether there is the physical contact between the user and the outsider by comparing the threshold voltage with the envelope voltage; and stopping the data communication when there is a physical contact between the user and the outsider, wherein the threshold voltage is set using an envelope voltage measured for a predetermined period of time when there is no physical contact between the user and the outsider.

2. The data security method of claim 1, wherein the setting of the threshold voltage comprises:

measuring the envelope voltage for the predetermined period of time when there is no physical contact between the user and the outsider;

obtaining a positive average value of the measured envelope voltage; and setting, as the threshold voltage, a voltage obtained by subtracting a pre-determined voltage from the average value.

3. The data security method of claim 1, wherein the setting of the threshold voltage comprises:

measuring the envelope voltage for the predetermined period of time when there is no physical contact between the user and the outsider;

obtaining a maximum value of the measured envelope voltage; and setting, as the threshold voltage, a voltage obtained by subtracting a pre-determined voltage from the maximum value.

4. The data security method of claim 1, wherein the performing of the data communication comprises:

performing the data communication using capacitive coupling.

5. The data security method of claim 4, wherein the wearable device performs communication according to international standard IEEE 802.15.6 wireless body area network (WBAN).

6. The data security method of claim 1, wherein the determining of whether there is the physical contact between the user and the outsider comprises:

determining whether the threshold voltage is greater than the envelope voltage for a first period of time.

7. The data security method of claim 6, further comprising:

performing the data communication continuously when the threshold voltage is not greater than the envelope voltage.

8. The data security method of claim 6, further comprising:

determining that there is the physical contact between the user and the outsider when the threshold voltage is greater than the envelope voltage.

9. The data security method of claim 8, further comprising:

notifying the user of the physical contact with the outsider when it is determined that there is the physical contact between the user and the outsider.

10. The data security method of claim 9, further comprising:

measuring an envelope voltage of a received signal after stopping the data communication; and determining whether the threshold voltage is less than the measured envelope voltage for a second period of time.

11. The data security method of claim 10, further comprising:

resuming the stopped data communication when it is determined that the threshold voltage is less than the measured envelope voltage for the second period of time.

12. The data security method of claim 10, further comprising:

re-measuring the envelope voltage of the received signal when it is determined that the threshold voltage is not less than the measured envelope voltage for the second period of time.

13. A wearable device attached to a human body of a user, comprising:

a signal receiver configured to receive a signal through the human body of the user;

an envelope detector configured to measure an envelope voltage of the received signal; and a voltage comparator configured to compare a threshold voltage with the envelope voltage in order to determine whether there is a physical contact between the user and an outsider, wherein the threshold voltage is set using an envelope voltage measured for a predetermined period of time when there is no physical contact between the user and the outsider, and wherein, when the threshold voltage is greater than the envelope voltage of the received signal, data communication corresponding to the received signal is stopped or a communication holding signal is transmitted to a signal transmitter.

14. The wearable device of claim 13, wherein the voltage comparator is configured to determine whether the threshold voltage is greater than the envelope voltage measured for a first period of time during the data communication, and when the threshold voltage is greater than the envelope voltage measured for the first period of time, the data communication is stopped or the communication holding signal is transmitted to the signal transmitter.

15. The wearable device of claim 13, wherein the voltage comparator is further configured to determine whether the threshold voltage is less than the envelope voltage measured for a second period of time after the data communication is stopped or the communication holding signal is transmitted, and when the threshold voltage is less than the envelope voltage measured for the second period of time, the data communication is resumed.

16. The wearable device of claim 13, further comprising:

a signal electrode configured to contact the human body; and a ground of a printed circuit board in which the signal receiver is implemented.

17. The wearable device of claim 13, wherein the threshold voltage is a value obtained by subtracting a pre-determined voltage from an average value of the envelope voltage measured for the predetermined period of time when there is no physical contact between the user and the outsider.

18. A data receiving method of a wearable device attached to a human body of a user, the data receiving method comprising:

receiving a signal via the human body for data communication;

filtering and amplifying the received signal;

measuring an envelope voltage of the filtered and amplified signal;

comparing a threshold voltage with the measured envelope voltage to determine whether there is a physical contact between the user and an outsider; and blocking the data communication when the measured envelope voltage is less than the threshold voltage, wherein the data receiving method further comprises setting the threshold voltage using an envelope voltage measured for a predetermined period of time when the data communication is proceeded and when there is no physical contact between the user and the outsider.

19. The data receiving method of claim 18, wherein the data communication uses a capacitive coupling scheme for data transmission.

20. The data receiving method of claim 18, wherein the setting of the threshold voltage comprises:

setting the threshold voltage by obtaining an average value of the envelope voltage measured for the predetermined period of time when there is no physical contact between the user and the outsider and by subtracting a pre-determined voltage from the average value; and storing data corresponding to the set threshold voltage.

\* \* \* \* \*